Packard & Hastings,
Steam Safety Valve.

Nº 77,084. Patented Apr. 21, 1868.

Witnesses
F. A. Hudicke
Wm C Ley

Inventors:
Ralph L. Packard
Michael Hastings

United States Patent Office.

RALPH G. PACKARD AND MICHAEL HASTINGS, OF BROOKLYN, NEW YORK.

Letters Patent No. 77,084, dated April 21, 1868.

IMPROVEMENT IN LOCK-UP SAFETY-VALVES.

The Schedule referred to in these Letters Patent and making part of the same.

TO ALL WHOM IT MAY CONCERN:

Be it known that we, RALPH G. PACKARD and MICHAEL HASTINGS, both of Brooklyn, in the county of Kings, and State of New York, have invented certain new and useful Improvements in Lock-Up Safety-Valves; and we do hereby declare that the following is a sufficiently full and exact description thereof to enable others skilled in the art to make and use the same.

We will first describe what we consider the best means of carrying out our invention, and will afterwards designate the points which we believe to be new. The accompanying drawings form a part of this specification.

Figure 3:
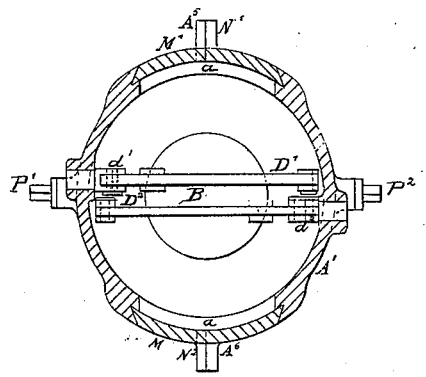
Figure 4:
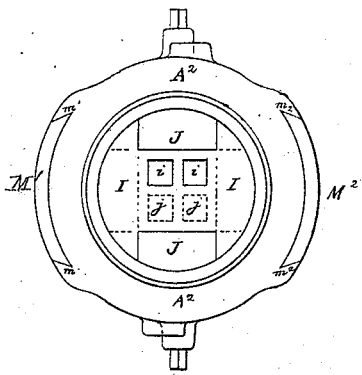
Figure 1:
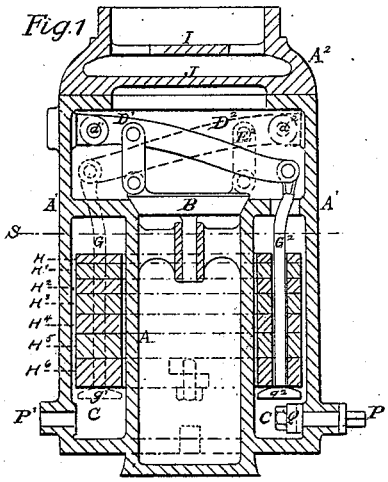
Figure 2:
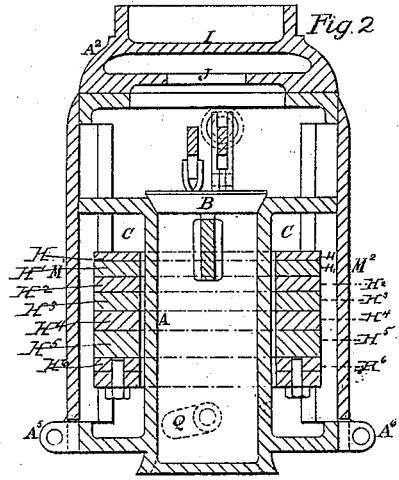
Figure 5:
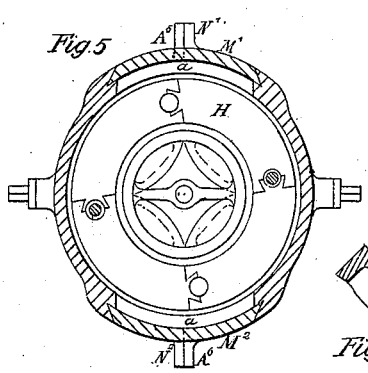
Figure 6:
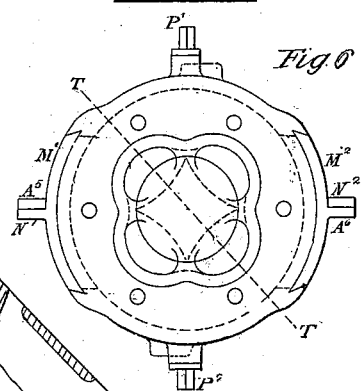
Figure 7:
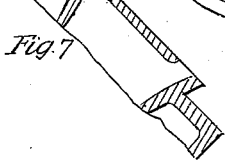

Figure 1 is a vertical section.
Figure 2 is a vertical section at right angles to fig. 1.
Figure 3 is a top view of the interior parts.
Figure 4 is a top view of the entire casing.
Figure 5 is a horizontal section on the line S S in fig. 1.
Figure 6 is a bottom view.
Figure 7 is a section through the top, on the line T T in fig. 6.

Similar letters of reference indicate like parts in all the figures.

A is a cylindrical casing or cast-iron pipe, extending upward from the orifice on which it is bolted on the boiler, not represented, and adapted to receive and sustain at all times the full boiler-pressure of the steam. B is the safety-valve, made conical as usual, and accurately ground to its seat on the upper end of the casing A. This safety-valve is steadied by the ordinary means, as represented. $A^1$ is a casing, exterior to the casing A, and forming a part of the steam-casing therewith. It is at such distance outside of the casing A as to leave an annular space, C. The casing $A^1$ extends upward above the casing A, as represented, and is provided with flanges, upon which are bolted the casing $A^2$, adapted to support the escape-pipe, not represented. The upper and lower ends of our compound casing are represented as provided with cross-bars, and the like, adapted to prevent the introduction of any means from outside to surreptitiously hold down the valve B.

$D^1$ $D^2$ are levers, hinged to the interior of the casing $A^1$, near the top, as represented at $d^1$ $d^2$. Links, $E^1$ $E^2$, connect the levers $D^1$ $D^2$ to the safety-valve B, in the manner represented, so that any loads applied on the extremities of the levers $D^1$ $D^2$, will be received upon the valve B with an increased force due to the leverage. $G^1$ $G^2$ are rods extending down into the annular space C, and carrying nuts $g^1$ $g^2$ at their lower ends. $H^1$ $H^2$, &c., are rings, of cast iron or other suitable material, made in the form represented, so as to be suspended freely in the annular space C, and to transmit their weight through the medium of the rods $G^1$ $G^2$, the levers $D^1$ $D^2$, and the connections $E^1$ $E^2$, to the valve B. The several rings, $H^1$, $H^2$, &c., are made in pieces, for purposes which will appear below.

$M^1$ $M^2$ are doors, constructed and applied so as to slide vertically in the grooves $m^1$ $m^2$, formed in the casing $A^1$. When these doors are raised, they uncover large openings $a$. Through these openings $a$ the weights $H^1$ $H^2$ are introduced, and removed as may be required, in order to load the safety-valve to the desired extent. The rings $H^1$, $H^2$, &c., are made each in separate pieces, so as to allow them to be immediately introduced and removed. The lowermost ring, $H^6$, is put together very stiffly by being halved and put together as indicated by dotted lines in fig. 1. The rings $H^1$ $H^2$ $H^3$ $H^4$ $H^5$ are each made in four pieces, and dove-tailed together, as indicated in fig. 5. These pieces require no special bolting to confine them together, but they are kept in place by their connection with each other, and with the bolts $G^1$ $G^2$, which pass through holes provided in the joints, as indicated in figs. 1 and 5. When it is desired to increase the load on the safety-valve, the doors $M^1$ $M^2$ may one or both be opened, and the uppermost ring is easily removed by simply disconnecting the dove-tailed joints one from the other, and removing the ring in pieces. The reverse of this operation will increase the weight. We can, if preferred, make the uppermost ring the form of the under rings, with hollow recesses in its upper surfaces, and may apply shot or other convenient weights, in as small a space as may be desired, to adjust the whole very delicately.

The lugs $N^1 N^2$ are cast on the lower ends of the doors $M^1 M^2$, and when the doors are shoved down to their fullest extent, so as to completely cover their respective apertures, these lugs stand alongside of corresponding lugs $A^5$ and $A^6$, on the fixed framing or casing. The padlocks may now be applied by introducing the hasp of the padlock through the holes in these several lugs, so as to lock the lug $N^1$ on the door $M^1$ to the fixed lug $A^5$, and to lock the lug $N^1$ on the sliding door $M^2$ to the fixed lug $A^6$.

We propose to employ, in some cases, an iron rod bent in a semicircular form, and having a head at one end, and an eye to receive a padlock at the other end. This bar being introduced through one pair of lugs, may be extended once around the outside of the case, and thence through the other pair of lugs. By means of such bolts, so arranged, one good padlock will secure both doors.

It is important to be able occasionally to raise the safety-valve. We have provided means for doing this with facility, but the load cannot possibly be increased by these means. $P^1 P^2$ are short shafts, extending through corresponding holes in the exterior casing $A^1$, and provided with a square head on the exterior, by which they can be readily turned by means of a wrench or other convenient handle, not represented. The arm 2 is fitted on the inner end of each of these shafts, as represented in dotted lines in fig. 2. Upon turning the shafts $P^1 P^2$, which are arranged opposite to each other, the corresponding arms Q are turned into the vertical or nearly vertical position, and by this action striking against the lower face of the lowermost weight $H^6$, lifts the whole of the annular load, and allows a very moderate steam-pressure to lift the valve B. Turning the shafts $P^1$ and $P^2$ back to their original position, allows the annular weights $H, H^1$, &c., to again close the valve B, and hold it tightly closed until the maximum pressure for which it is loaded is reached.

I and J are diaphragms or horizontal partitions, cast in the upper portion of the casing $A^2$. The holes $i$ in the diaphragm I, do not coincide or are not in line with the holes $j$, in the diaphragm J. It follows from this arrangement of the diaphragm and openings, that the steam flowing through the safety-valve can find a very free egress through the openings $j$, and thence can travel horizontally between the diaphragms I and J, and thence pass out through the openings $a$, while the arrangement forbids the introduction of a bar of iron or other solid object, so as to hold down the safety-valve, or the levers connected therewith, by any improper means.

The same provision may be employed at the base of the casing A, to prevent the taking hold of the valve from below, and thus holding it down by any means arranged within the boiler. We do not, however, deem it important to fortify this point so securely.

The valve may be lifted by means of the bent shaft extending across the casing A, under the levers $D^1 D^2$, and so arranged that by means of a hand-lever outside the case, the shaft may be turned so as to act on the under sides of both the levers $D^1 D^2$ and ways, both simultaneously. The plan represented in the drawings is, however, preferable for the reason that it requires less nice adjustment of the parts to make it operate efficiently on both sides.

The advantages of the principal features of our invention will be apparent to engineers. The construction and arrangement of the weights allow the whole structure to be made in a very compact form, and to be very conveniently adjusted by the increase or diminution of the load, and the peculiar arrangement of the levers D and links E, relatively to the valve and weights, allows a given mass in the annular weights to load the valve much heavier than would be possible if the connection through the load led, as usual, directly upon the centre of the valve B.

We do not claim the construction of the casing and valve, or the arrangement of the levers, &c., but having now fully described our invention, together with the best means known to us for putting it in practice,

We claim as follows:

1. We claim, in lock-up safety-valves, forming the weights in sections, adapted to be inserted and removed through openings $a$, in the exterior or lock-up casing, substantially as and for the purpose herein specified.

2. We claim, in connection with the above, dove-tailing together the several pieces, substantially as and for the purpose herein set forth.

In testimony whereof, we have hereunto set our hands in the presence of two subscribing witnesses.

RALPH G. PACKARD,
MICHAEL HASTINGS.

Witnesses:
  C. C. LIVINGS,
  F. A. HADICKE.